M. B. HILL.
Hose-Coupling.

No. 228,196.     Patented June 1, 1880.

Witnesses:

Inventor:
Milton B. Hill

UNITED STATES PATENT OFFICE.

MILTON B. HILL, OF MOLINE, ILLINOIS.

HOSE-COUPLING.

SPECIFICATION forming part of Letters Patent No. 228,196, dated June 1, 1880.

Application filed August 28, 1879.

*To all whom it may concern:*

Be it known that I, MILTON B. HILL, of Moline, in the county of Rock Island and State of Illinois, have invented a new and useful Improvement in Hose-Couplings, of which the following is a specification.

This invention has relation more especially to the couplings for fire-hose, and has for its object to provide a quick and secure mode of coupling, dispensing with screws, clamps, or similar contrivances, which usually require longer time in their application than can well be spared at a fire or any other similar sudden emergency.

To this end it consists in an improved construction and combination of parts, as hereinafter more fully described, and particularly pointed out in the claims.

Figure 1:
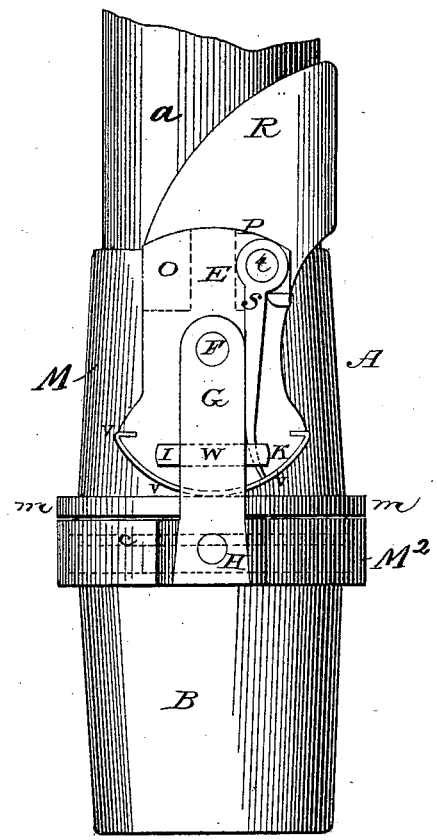

In the drawings, A B are the two opposite ends of sections of hose provided with my improved coupling, which is represented in side elevation (both sides being exactly alike) in Figure 1.

Figure 2:
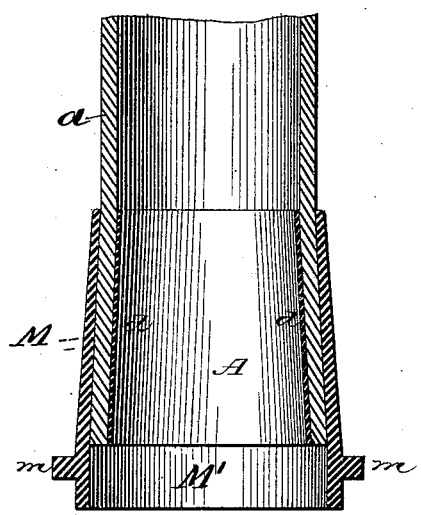

In Fig. 2 I have represented a vertical axial section of the end of one of the sections, A, from which it will be seen that the hose $a$ (which may be of rubber, canvas, leather, or any other suitable material) is inserted into a conical metal sleeve, M, and clamped therein by a conical thimble, $d$.

The sleeve M of the upper section has an annular projecting flange, $m$, surrounding its cylindrical rim M', which, in coupling the sections A B, as shown in Fig. 1, is fitted into the annular seat $c$ of the cylindrical rim $M^2$ of the section opposite, which said annular seat or recess is provided with a rubber packing-ring to effect a tight joint and avoid leakage.

Upon diametrically-opposite sides of the rim $M^2$ of section B is secured, by dovetailing and riveting (as shown at H) or otherwise, a standard, G, in the upper end of which is a pin, F, upon which the cam E is pivoted. There are, of course, two of these cams, one on each side, which are connected by a curved band or strap, R.

Each of the co-operating cams E has a pin or lug, I, at its lower end, which, when the cam is in the locked position represented in the drawings, will impinge upon its standard G.

Projecting from the obliquely-opposite corner of cam E is a stud, $t$, upon which is pivoted the upper end or head of a spring, S, the lower end of which is attached to the cam, the tension of the spring serving to keep its cam in the upright or locked position.

To still further lock each of the cams into its coupled position, I employ a flat spring, W, which is secured transversely upon each of the standards G, and terminates in a stud, K, so that in locking the coupling each of the cams E will slip over spring W, after which the stud K springs to its place, as clearly shown in Fig. 1 of the drawings.

In cases where a spanner is used in coupling, the connecting band or strap R may be dispensed with, in which case the upper end of each of the pivoted cams E should be cut away, as shown at O and P in dotted lines, to admit of the insertion of the points or ends of the spanner in operating the cams, the segmental lower ends of which bear against the annular flange $m$ of the section opposite, and thus force the lower rim of the sleeve M M' firmly against the packing in the seat $c$ of section B, into which it is inserted.

In order to prevent wear in operating the cams E, these are, by preference, shod with a steel band, $v$, as shown in Fig. 1 of the drawings.

Having thus described my invention, I claim and desire to secure by Letters Patent of the United States—

1. In a hose-coupling, the combination, with the section B, having annular rim $M^2$ and packed seat $c$, and its connecting-section A, having annular rim M' and flange $m$, of the eccentric locking device, consisting of the standards G, hinged cams E, having studs I $t$, spring W, having stud K, and spring S, all constructed and combined to operate substantially in the manner and for the purpose herein shown and described.

2. The coupling sleeve or section B, having cylindrical rim $M^2$ and packed seat $c$, and provided with a pair of diametrically-opposite standards, G, carrying the pivoted cams E, provided each with the studs I $t$, spring W, having stud K, and pivoted spring S, of the contiguous coupling-sleeve M, provided with the cylindrical rim M' and annular flange $m$, substantially as and for the purpose herein shown and set forth.

MILTON B. HILL.

Witnesses:
ELSWORTH MAPES,
BEDER WOOD.